US011379993B2

(12) United States Patent
Magai

(10) Patent No.: US 11,379,993 B2
(45) Date of Patent: Jul. 5, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Koichi Magai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 16/773,439

(22) Filed: Jan. 27, 2020

(65) Prior Publication Data

US 2020/0242780 A1   Jul. 30, 2020

(30) Foreign Application Priority Data

Jan. 28, 2019 (JP) .............................. JP2019-012348

(51) Int. Cl.
*G06T 7/20* (2017.01)
*G06T 7/00* (2017.01)
*G06T 7/11* (2017.01)

(52) U.S. Cl.
CPC ................. *G06T 7/20* (2013.01); *G06T 7/11* (2017.01); *G06T 7/97* (2017.01); *G06T 2207/10016* (2013.01); *G06T 2207/30241* (2013.01)

(58) Field of Classification Search
CPC . G06T 2207/10016; G06T 2207/30196; G06T 2207/30241; G06T 7/11; G06T 7/20; G06T 7/238; G06T 7/97
See application file for complete search history.

(56) References Cited

U.S. PATENT DOCUMENTS

| 6,569,092 B1* | 5/2003 | Guichon | A01K 11/008 128/920 |
| 8,271,497 B2* | 9/2012 | Ikenoue | G06F 16/29 701/426 |
| 10,930,317 B2* | 2/2021 | Ogawa | H04N 5/91 |
| 2009/0296415 A1* | 12/2009 | Heinrich | G06V 20/584 362/465 |
| 2010/0021009 A1* | 1/2010 | Yao | G06V 20/54 382/103 |

(Continued)

FOREIGN PATENT DOCUMENTS

JP   2002-373332 A   12/2002
JP   2006-172064 A   6/2006

OTHER PUBLICATIONS

Bors, Adrian G., and Ioannis Pitas. "Prediction and tracking of moving objects in image sequences." IEEE Transactions on Image Processing 9.8 (2000): 1441-1445. (Year: 2000).*

(Continued)

*Primary Examiner* — Bobbak Safaipour
(74) *Attorney, Agent, or Firm* — Canon U.S.A., Inc. IP Division

(57) ABSTRACT

An image processing apparatus includes an image acquisition unit configured to extract an image from a video image, a history management unit configured to generate movement history of an object, a setting unit configured to set a search range in the image based on the movement history, and a tracking unit configured to detect a target object in the search range and associate a currently detected target object with a previously detected target object, to perform tracking on the target object.

17 Claims, 8 Drawing Sheets

(56) References Cited

U.S. PATENT DOCUMENTS

| | | | |
|---|---|---|---|
| 2012/0020518 A1* | 1/2012 | Taguchi | G06T 7/292 |
| | | | 382/103 |
| 2013/0050502 A1* | 2/2013 | Saito | G06T 7/20 |
| | | | 348/169 |
| 2016/0323532 A1* | 11/2016 | Gouda | H04N 5/45 |
| 2017/0140231 A1* | 5/2017 | Chen | G06T 7/292 |
| 2018/0081908 A1* | 3/2018 | Matsubara | G06F 16/5854 |
| 2018/0115852 A1* | 4/2018 | Kitazawa | H04R 3/005 |
| 2018/0241972 A1* | 8/2018 | Lee | H04N 7/181 |
| 2018/0278801 A1* | 9/2018 | Ohno | G06V 20/52 |
| 2019/0102630 A1* | 4/2019 | Bamba | G06K 9/6218 |
| 2020/0242780 A1* | 7/2020 | Magai | G06T 7/238 |
| 2020/0250839 A1* | 8/2020 | Hayashi | G06T 11/00 |
| 2020/0259996 A1* | 8/2020 | Katayama | G06V 20/42 |
| 2020/0285905 A1* | 9/2020 | Kajiwara | G06V 20/56 |
| 2020/0327678 A1* | 10/2020 | Wang | G06T 7/70 |
| 2021/0035327 A1* | 2/2021 | Magai | G06T 7/74 |

OTHER PUBLICATIONS

Saglio, Jean-Marc, and Jose Moreira. "Oporto: A realistic scenario generator for moving objects." GeoInformatica 5.1 (2001): 71-93. (Year: 2001).*

* cited by examiner

IMAGE PROCESSING APPARATUS, IMAGE PROCESSING METHOD, AND STORAGE MEDIUM

BACKGROUND

Field of the Disclosure

The present disclosure relates to an image processing apparatus, an image processing method, and a storage medium.

Description of the Related Art

Conventionally, there is a technique for tracking an object or a human body detected from a video image of a camera. For example, Japanese Patent Application Laid-Open No. 2002-373332 discusses a technique for performing tracking by template matching taking into account the state of overlapping of templates, and for estimating a search position in the next frame image based on a motion vector. Japanese Patent Application Laid-Open No. 2006-172064 discusses a technique for dividing a captured image into a plurality of tracking areas first, next based on the distribution of movement vectors of an edge present in the tracking areas, calculating an average movement vector, and then based on the calculated average movement vector, following (tracking) the movement of the edge present in the tracking areas.

With the above-described methods, based on the most recent moving direction or velocity of an object of interest, the appearance position of the object in the next frame is predicted, a search area is set based on the predicted appearance position, and the object of interest or a human body is searched for in the search area. In these methods, however, if the tendency of the movement of the tracking target object goes beyond the initial assumption, the frequency of occurrence of detection errors in which the object is not detected in the set search area increases. This corresponds to a case where, for example, in a state where an appearance position is predicted and a search area is set in the next frame on the premise of a uniform linear motion, the direction or the speed of the flow of people suddenly changes.

If the frequency of occurrence of detection errors increases, a measure is taken, such as enlarging the search area or shortening the prediction time intervals, to reduce the frequency of occurrence of detection errors. This measure can maintain tracking accuracy, but increases the calculation amount of processing. As a result, in the above methods for predicting the appearance position of the object in the next frame based on the most recent moving direction or velocity of the object, it is not easy to reduce the calculation amount of processing without reducing tracking accuracy.

SUMMARY

The present invention is directed to an image processing apparatus for tracking an object detected from a video image, and capable of reducing the calculation amount of processing without reducing tracking accuracy.

According to an aspect of the present disclosure, an image processing apparatus includes an image acquisition unit configured to extract an image from a video image, a history management unit configured to generate a movement history of an object, a setting unit configured to set a search range in the image based on the movement history, and a tracking unit configured to detect a target object in the search range and associate a currently detected target object with a previously detected target object, thereby to perform tracking on the object as the target.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings.

To both maintain tracking accuracy and reduce calculation cost, an image processing apparatus according to the exemplary embodiments uses a movement history of an object, thereby reducing the frequency of occurrence of detection errors in which the object is not detected in the set search range, while limiting a search range for tracking. The movement history is obtained as follows. When an observation position g of an object is determined, and if an object h is present at the observation position g in a frame $t_0$, information indicating which position the object h moves to in a frame $(t_0+\Delta t)$ after a predetermined time $\Delta t$ (the number of difference frames from the movement destination) is aggregated regarding a certain number or more of objects.

A first exemplary embodiment of the present disclosure is described.

Figure 1:
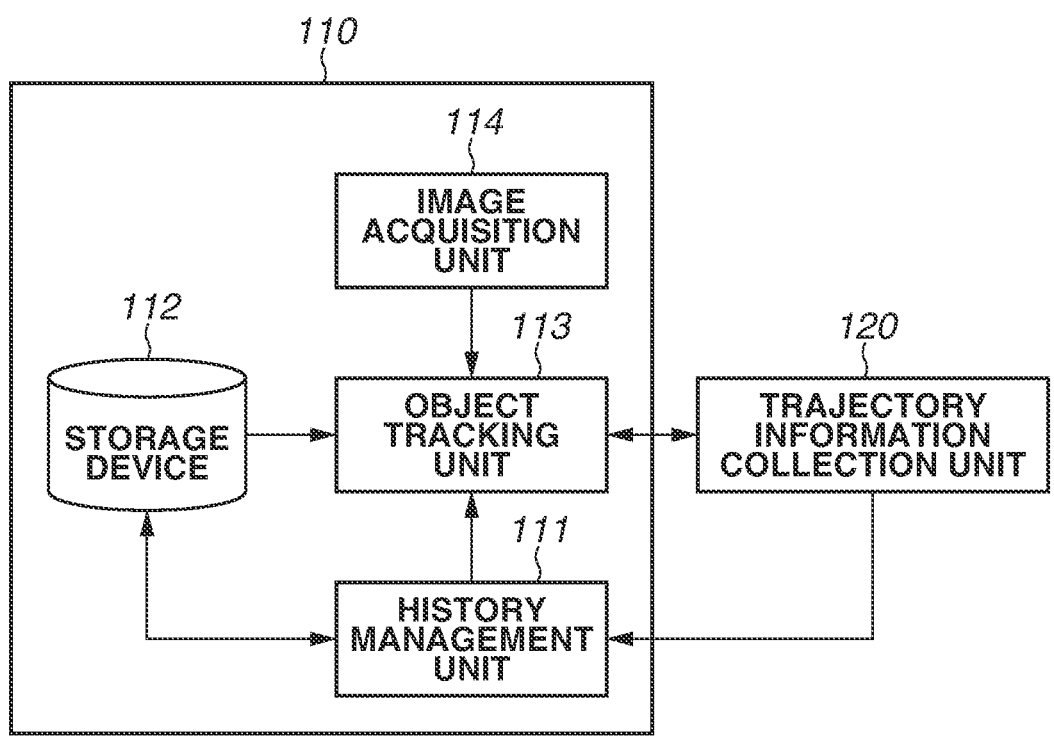
FIG. 1 is a block diagram illustrating an example of a configuration of an image processing apparatus according to one or more aspects of the present disclosure.

FIG. 1 is a block diagram illustrating an example of a configuration of an image processing apparatus 110 according to the first exemplary embodiment. The image processing apparatus 110 includes a history management unit 111, a storage device 112, an object tracking unit 113, and an image acquisition unit 114. The history management unit 111 generates a movement history of each object based on collected trajectory information. The movement history of the object generated by the history management unit 111 is stored in the storage device 112.

The object tracking unit 113 detects a tracking target object from an image acquired by the image acquisition unit 114, thereby tracking the object of the tracking target. The image acquisition unit 114 acquires an image of a processing target in chronological order from an external apparatus such as a camera or a server. The image acquisition unit 114 may acquire an image saved in an external memory or the like.

Using existing trajectory information collected by a trajectory information collection unit 120, the image processing apparatus 110 according to the first exemplary embodiment generates movement history and tracks an object of a tracking target. The trajectory information is information enabling an identification of position information regarding the position on a past frame of the object of the tracking target and includes information such as an object identification (ID), an object position, and a time. The trajectory information regarding the object may include size or attribute information regarding the object. A part of the following description is given using the tracking of a human body as an example. The image processing apparatus according to the present exemplary embodiment, however, is not limited to the tracking of a human body, and can be used to track any object.

Figure 2:
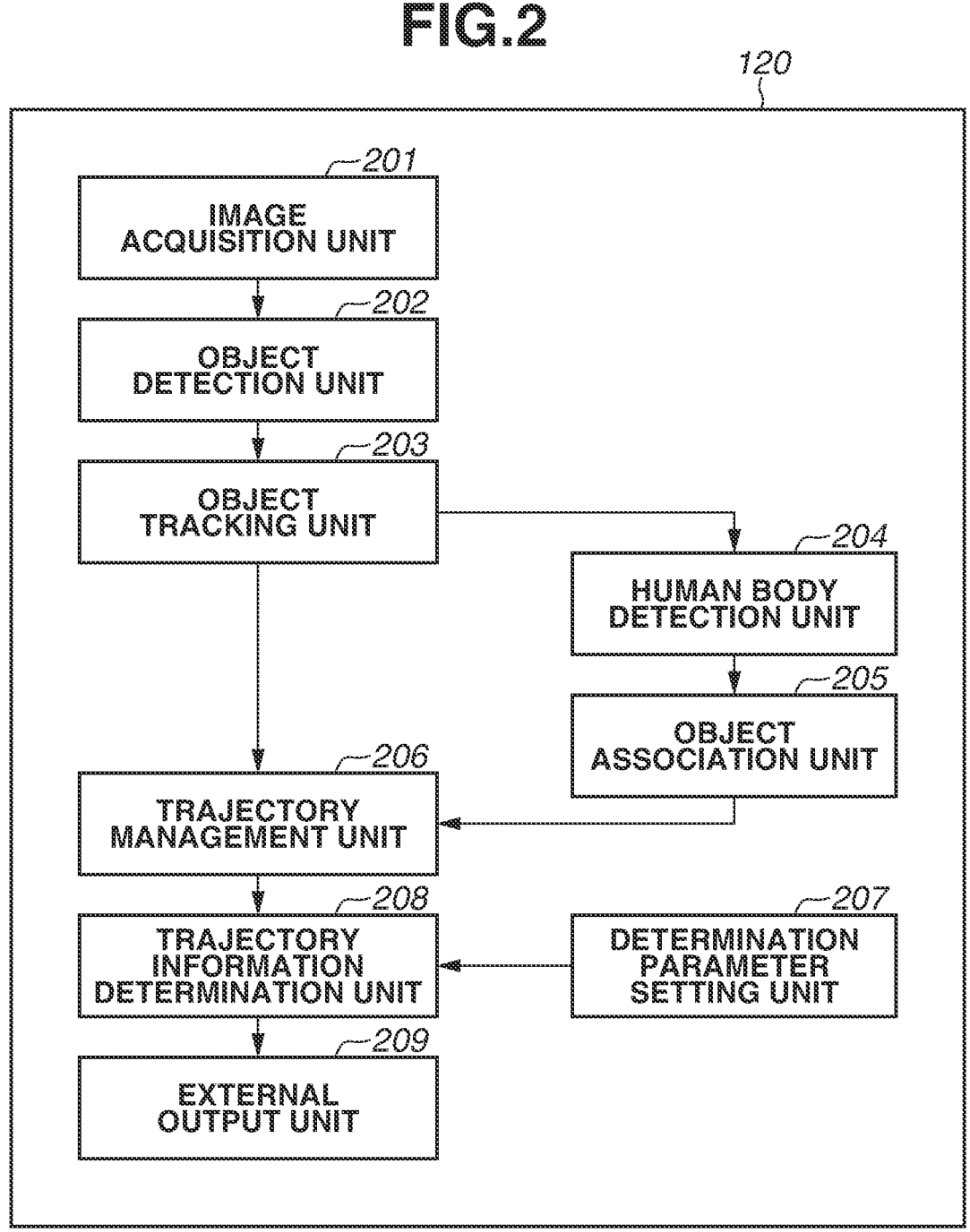
FIG. 2 is a block diagram illustrating an example of a configuration of a trajectory information collection unit according to one or more aspects of the present disclosure.

FIG. 2 is a block diagram illustrating an example of a configuration of the trajectory information collection unit 120. The trajectory information collection unit 120 includes an image acquisition unit 201, an object detection unit 202, an object tracking unit 203, a human body detection unit 204, an object association unit 205, a trajectory management unit 206, a determination parameter setting unit 207, a trajectory information determination unit 208, and an external output unit 209. The image acquisition unit 201 acquires an image of a processing target (a frame of a video image) in chronological order from an external apparatus. This external apparatus is, for example, a camera or a server. The image acquisition unit 201, however, may acquire an image saved in an external memory.

The object detection unit 202 detects an object by a background subtraction method from the image acquired by the image acquisition unit 201. The object detected at this time is, for example, a moving object. Alternatively, the object may be a foreground detected by the background subtraction method. Yet alternatively, the object may be a portion that is not a background according to a determination. Information regarding the detected object includes, for example, the position on a screen, a circumscribed rectangle, and a size of the object. The object detection unit 202 only needs to be able to detect the object from the image, and the method for detecting the object is not limited to the background subtraction method. The object tracking unit 203 associates the object detected by the object detection unit 202 with the object detected in the previous image, thereby tracking the detected object. To an object that newly appears, the object tracking unit 203 newly assigns an object ID. To an object that can be associated with the previous image, the object tracking unit 203 assigns an object ID assigned in the previous image.

The human body detection unit 204 detects a human body by a pattern matching process from an area where the object detection unit 202 detects the object. The processing by the human body detection unit 204 is the process of detecting a human body from a video image, and is not limited to the pattern matching process. A human body does not necessarily need to be detected from the area where the object detection unit 202 detects the object. The process of detecting a human body may be performed on the entire image. Further, the detection target is not limited to a human body. It is only necessary to detect that the object is a particular object (an object having a particular feature or an object having a particular pattern according to a determination).

For example, it may be detected that the object is an automobile or an animal. The object association unit 205 determines the association between the object detected by the object detection unit 202 and the human body detected by the human body detection unit 204.

The trajectory management unit 206 generates and manages trajectory information regarding the object tracked by the object tracking unit 203. The trajectory management unit 206 manages, as an attribute of the object, information regarding the human body associated with the object by the object association unit 205. In other words, the trajectory management unit 206 manages the fact that the tracked object is associated with the human body (particular object) by the object association unit 205. The determination parameter setting unit 207 externally sets, in the trajectory information determination unit 208, determination parameters for determining the trajectory information regarding the object. The determination parameters include a set of coordinates indicating the location where the determination is to be made, an area type for determining the treatment of the set of coordinates as an "area" or a "line", a range of the object size, an object attribute, the number of attributes, the range of time of presence in the screen, and a detection event.

Based on the determination parameters set by the determination parameter setting unit 207, the trajectory information determination unit 208 determines the trajectory information regarding the object managed by the trajectory management unit 206, thereby detecting a desired object. The process of determining the trajectory information is performed on all the set determination parameters every time the trajectory management unit 206 updates the trajectory information. For example, the trajectory information determination unit 208 determines that the tracked object passes through a particular location. The external output unit 209 outputs the trajectory information regarding the object managed by the trajectory management unit 206 and the determination result of the trajectory information determination unit 208 to the outside.

Next, a description is given of the movement history of an object for use in an object tracking process in the present exemplary embodiment. In the present exemplary embodiment, an image area is divided into a plurality of areas, and movement history is generated for each divided area. In the following example, the movement history is generated in units of grid cells generated by dividing the image area into a grid. More specifically, regarding an object h present in a grid cell g in a frame $t_0$, if a frame $(t_0+\Delta t)$ a predetermined time $\Delta t$ later is set as a movement destination prediction frame, information indicating which position the object h moves to in the movement destination prediction frame is aggregated. In the aggregation, each of the positions of the movement destinations of all the objects of targets is identified, and then, the positions are clustered. Then, a search priority is set for each cluster generated by the clustering.

Figure 3:
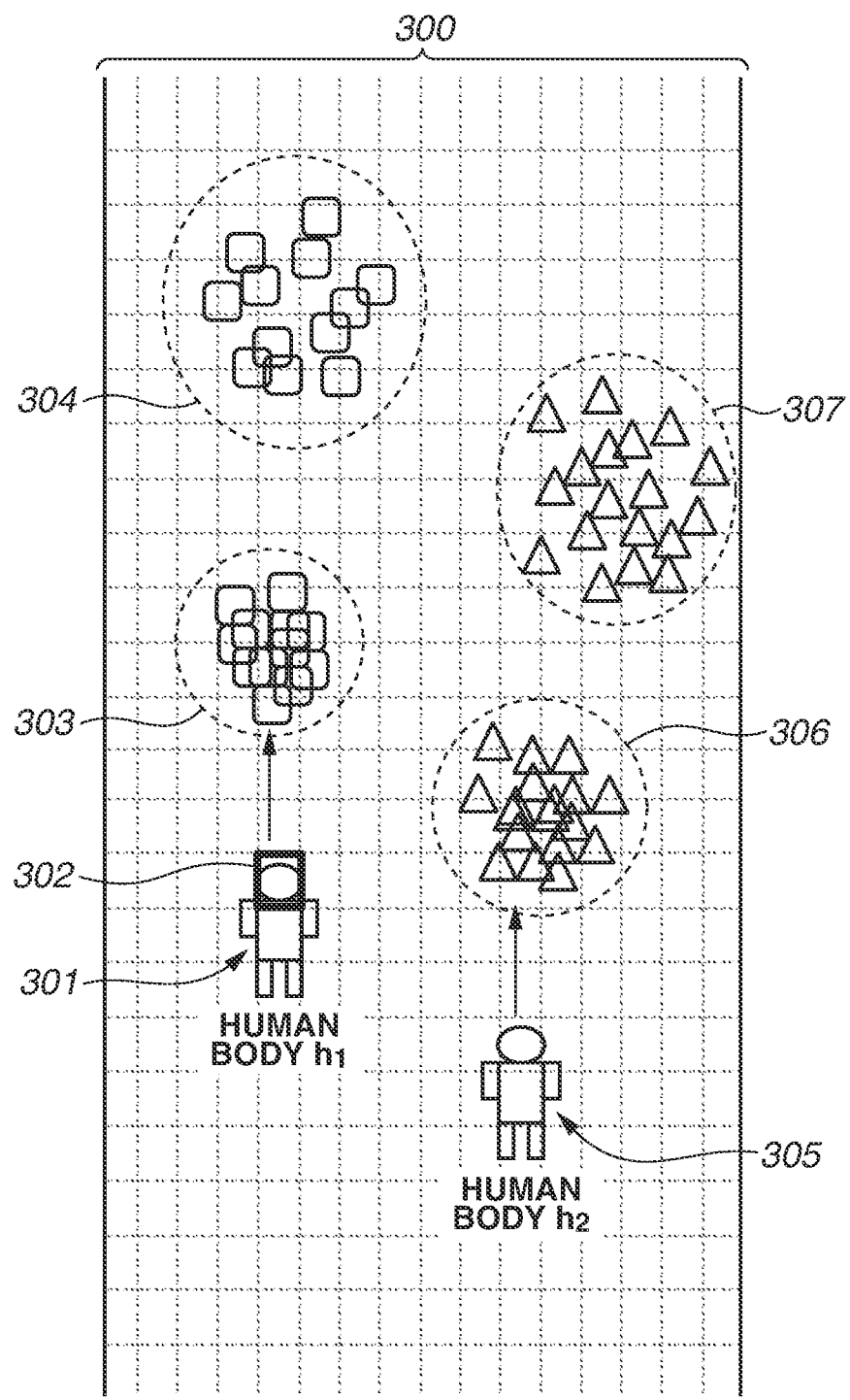
FIG. 3 is a diagram illustrating a movement history according to one or more aspects of the present disclosure.

FIG. 3 is a diagram illustrating the movement history of an object according to the present exemplary embodiment. FIG. 3 illustrates an image area 300 where tracking is to be performed. In the image area 300, a grid is indicated by dashed lines. Objects 301 and 305 are an object (human body) $h_1$ and an object (human body) $h_2$, respectively, of tracking targets and are assumed to be human bodies in this example. A human body is tracked by tracking "the center of the head". Thus, "the position of the human body" is determined based on the position of the center of the head. Accordingly, in the example illustrated in FIG. 3, a grid cell $g_1$ where the human body $h_1$ is present is a grid cell 302 (a thick black-framed rectangular portion).

A movement destination 303 is a movement destination plot ($g_1$) obtained by, in a case where a frame in which a plurality of human bodies passes through the grid cell $g_1$ is a frame $t_0$, collecting the movement destinations of each of the plurality of human bodies in a frame ($t_0+\Delta t$) for a predetermined period. Each of the collected movement destinations is indicated by a symbol "☐ (white square)". Similarly, a portion 306 is a movement destination plot ($g_2$) obtained by, in a case where a frame in which a plurality of human bodies passes through a grid cell $g_2$ where the human body $h_2$ is present (a grid cell where the head of the object 305 is located) is the frame $t_0$, collecting the movement destinations of each of the plurality of human bodies in the frame ($t_0+\Delta t$) for the predetermined time. In this case, each of the collected movement destinations is indicated by a symbol "△ (white triangle)".

Each of the plurality of human bodies having passed through the grid cell $g_1$ in the frame $t_0$ moves to a movement destination 304 in a frame ($t_0+2\times\Delta t$). Each of the plurality of human bodies having passed through the grid cell $g_2$ moves to a movement destination 307 in the frame ($t_0+2\times\Delta t$). Generally, the ranges of the movement destinations 304 and 307 are wider than the ranges of the corresponding movement destinations 303 and 306.

<Generation of Movement History>

Figure 4:
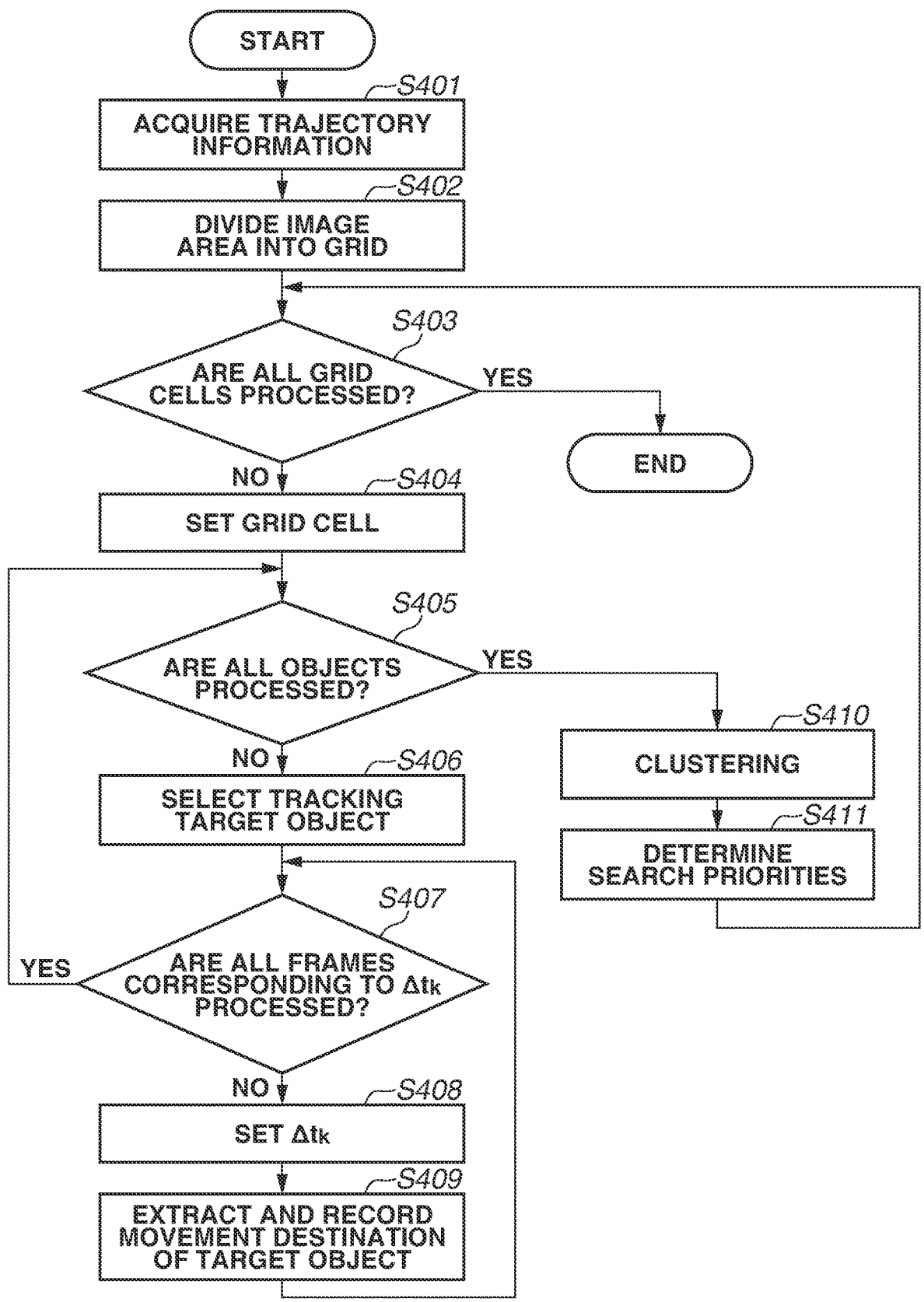
FIG. 4 is a flowchart illustrating an example of a movement history generation process according to one or more aspects of the present disclosure.

A description is given below of the generation of the movement history of an object according to the first exemplary embodiment. In the present exemplary embodiment, based on trajectory information collected by the trajectory information collection unit 120, the history management unit 111 generates the movement history of an object. FIG. 4 is a flowchart illustrating an example of the movement history generation process according to the first exemplary embodiment.

If the movement history generation process is started, then in step S401, the history management unit 111 acquires trajectory information from the trajectory information collection unit 120. In the trajectory information collection unit 120, the trajectory management unit 206 manages the trajectory information. Next, in step S402, the history management unit 111 divides an image area where tracking is to be performed into a grid, and associates the coordinates of trajectories in the trajectory information with grid cells.

In step S403, the history management unit 111 determines whether the movement history generation process is executed on all the grid cells obtained by the grid division in step S402. If the history management unit 111 determines that the movement history generation process is executed on all the grid cells, i.e., no grid cell of a processing target remains (YES in step S403), the history management unit 111 ends the movement history generation process. If, on the other hand, the history management unit 111 determines that the movement history generation process is executed not on all the grid cells, i.e., a grid cell of a processing target remains (NO in step S403), the processing proceeds to step S404. In step S404, the history management unit 111 sets a grid cell (grid cell $g_i$) as a processing target from among grid cells that have not yet been processed. Then, the processing proceeds to step S405.

After setting the grid cell $g_i$, in step S405, the history management unit 111 determines whether the processes of step S406 and after that are executed on all the objects having passed through the grid cell $g_i$. If the history management unit 111 determines that the processes of step S406 and after that are executed on all the objects having passed through the grid cell $g_i$, i.e., the processing regarding the grid cell $g_i$ is completed (YES in step S405), the processing proceeds to step S410. If the history management unit 111 determines that the processes of step S406 and after that are executed not on all the objects having passed through the grid cell $g_i$, i.e., an object that has not yet been processed is present among the objects having passed through the grid cell $g_i$ (NO in step S405), the processing proceeds to step S406.

In step S406, the history management unit 111 selects an object $h_j$ as a tracking target object from among objects that have passed through the grid cell $g_i$, but have not yet been processed. Then, the processing proceeds to step S407. In the present exemplary embodiment, the history management unit 111 extracts a single trajectory associated with the grid cell $g_i$ from the trajectory information and sets, as the object $h_j$, an object associated with the trajectory. At this time, the frame number of a frame in which the object $h_j$ appears for the first time on the grid cell $g_i$ is set to a frame $t_0$.

After selecting the object $h_j$ as the tracking target object, in step S407, the history management unit 111 determines whether the movement destinations of the object $h_j$ as the target are extracted and recorded for all the frames in which the movement destinations of the object $h_j$ are to be aggregated. At this time, regarding the frames in which the movement destinations of the object $h_j$ are to be aggregated, some of $\Delta t_k$ may be set in advance, and the frame number of a frame in which the movement destination is to be aggregated is set to a frame ($t_0+\Delta t_k$). $\Delta t_k$ may be set in any manner. For example, if a setting is made in such a manner that $\Delta t_k=10\times k$ ($k=1, 2, 3, \ldots, 10$), the movement destinations of the object $h_j$ are aggregated ten times every ten frames from the frame $t_0$ where the object $h_j$ appears for the first time on the grid cell $g_i$ to the hundredth frame.

If the history management unit 111 determines that the movement destinations are extracted and recorded for all the frames in which the movement destinations of the object $h_j$ are to be aggregated, i.e., processing is performed on all the frames corresponding to $\Delta t_k$ (YES in step S407), the processing proceeds to step S405. If, on the other hand, the history management unit 111 determines that the movement destinations are extracted and recorded not for all the frames in which the movement destinations of the object $h_j$ are to be aggregated, i.e., a frame that has not yet been processed is present (NO in step S407), the processing proceeds to step S408. In step S408, the history management unit 111 determines the frame number of a frame in which the movement destination of the object $h_j$ is to be aggregated among frames that have not yet been processed. More specifically, the history management unit 111 specifies $\Delta t_k$ in a sequential order, thereby determining the frame number of the frame in which the movement destination of the object $h_j$ is to be aggregated.

In step S409, the history management unit 111 extracts the movement destination of the object $h_j$ in the frame ($t_0+\Delta t_k$). In the present exemplary embodiment, the history management unit 111 traces a trajectory associated with the object $h_j$, thereby extracting the coordinates of the destination to which the object $h_j$ moves in the frame ($t_0+\Delta t_k$). Then, the history management unit 111 records the coordinates in the storage device 112. Then, the processing returns to step S407.

The process of step S410 is executed if it is determined in step S405 that no object remains to be selected among the objects having passed through the grid cell $g_i$. In this case, at the time immediately before the process of step S410 is performed, the coordinates of the movement destinations of the objects having passed through the grid cell $g_i$ in the frame ($t_0+\Delta t_k$) are recorded in the storage device 112. In the present exemplary embodiment, however, $\Delta t_k=10\times k$ (k=1, 2, 3, . . . , 10). For example, in the example illustrated in FIG. 3, if the grid cell $g_i$ is the grid cell 302, and $\Delta t=\Delta t_{30}$, the movement destinations 303 is the movement destinations $\Delta t_{30}$ frames later of the (plurality of) human bodies $h_j$ having passed through the grid cell $g_i$. The movement destination 304 is the movement destinations $\Delta t_{60}$ frames later of the (plurality of) human bodies $h_j$ having passed through the grid cell $g_i$.

In step S410, the history management unit 111 clusters the movement destinations of the objects having passed through the grid cell $g_i$. In the present exemplary embodiment, the unit of clustering is each grid cell in each frame corresponding to $\Delta t_k$. A counter is provided for each grid cell in a frame corresponding to $\Delta t_k$, and the number of times the grid cell is specified as the movement destination (the coordinates of the movement destination belong to the grid cell) is counted. If the counting is completed, the history management unit 111 extracts a grid cell ($\Delta t_k$, $g_i$) having a count value greater than or equal to a predetermined number of times. If grid cells having count values greater than or equal to the predetermined number of times are adjacent to each other, the grid cells may be joined together as a single cluster. In the present exemplary embodiment, for ease of description, the grid cells are not joined together, and the individual grid cells are treated as separate clusters.

In step S411, the history management unit 111 sets search priorities for the clusters (the grid cells in the present exemplary embodiment) extracted in step S410. In the present exemplary embodiment, the history management unit 111 calculates a priority score Sc by using Sc=n×k and sets the priority score Sc in such a manner that as the priority score Sc of the cluster is higher, the search priority is higher. n is a count number indicating the number of times the cluster is specified as the movement destination. k is k in $\Delta t_k=10\times k$ (k=1, 2, 3, . . . , 10). Thus, the greater the count number n is, the more likely the cluster is to be the movement destination. The greater the value k is, the more reduced the calculation amount can be. If the setting of the search priorities is completed, the history management unit 111 assigns the search priorities set in step S411 to the clusters. Then, the history management unit 111 records, in the storage device 112, the movement history including cluster information ($\Delta t_k$: the number of prediction execution difference frames, g: the observation position, $g_i$: the movement destination). If the recording is completed, the processing returns to step S403.

If the above-described processing on all the grid cells obtained by the grid division in step S402 is completed, the generation of the movement history ends.

<Tracking Process>

Figure 5:
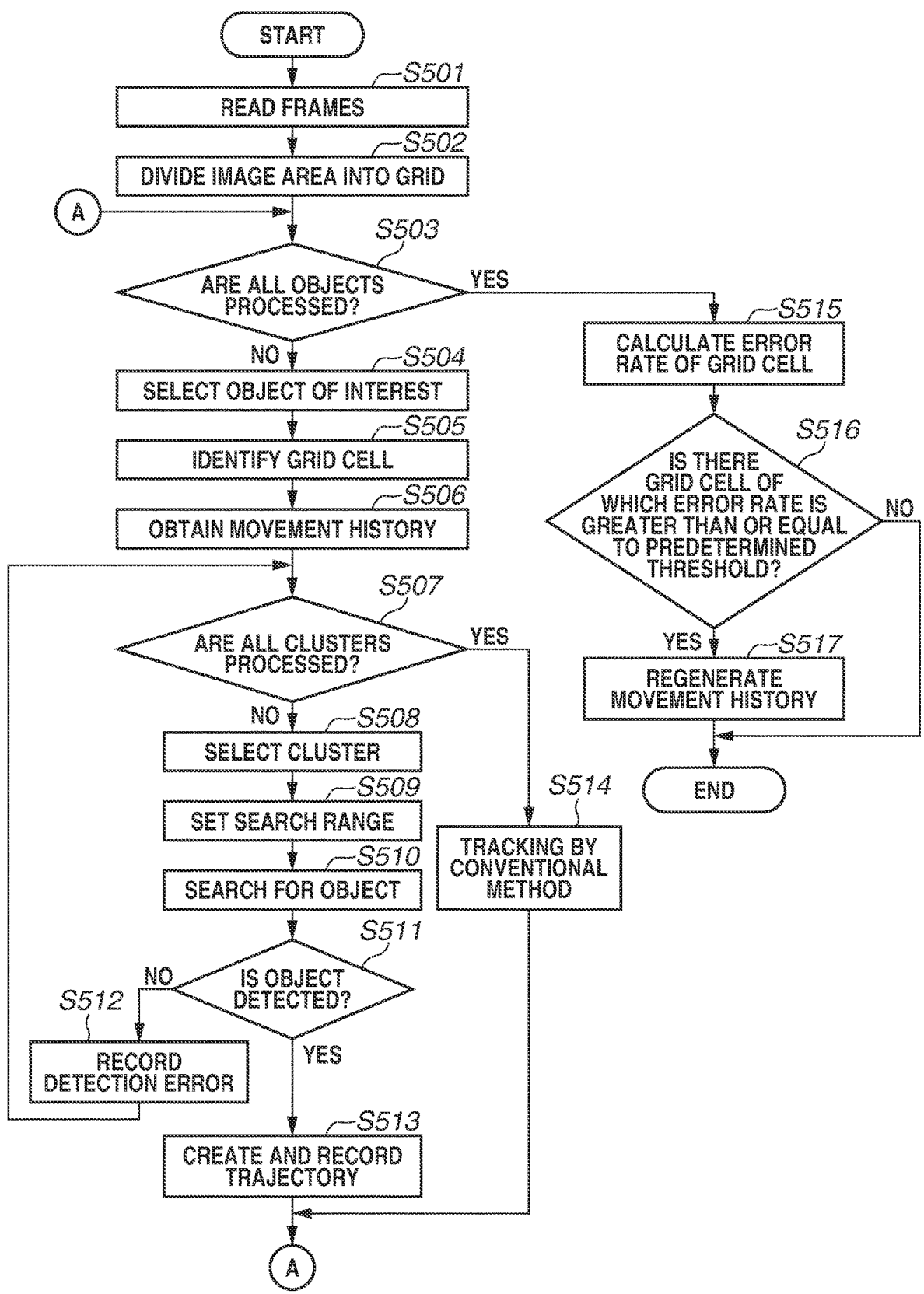
FIG. 5 is a flowchart illustrating an example of a tracking process according to one or more aspects of the present disclosure.

Next, a description is given of a tracking process performed by the image processing apparatus 110 according to the first exemplary embodiment. In the present exemplary embodiment, using the movement history generated as described above by the history management unit 111, the object tracking unit 113 of the image processing apparatus 110 performs an object tracking process. FIG. 5 is a flowchart illustrating an example of the tracking process according to the first exemplary embodiment.

If the object tracking process is started, in step S501, the object tracking unit 113 reads F temporally consecutive frames via the image acquisition unit 114. In the present exemplary embodiment, $F \geq \Delta t_{10}$ (=100). Next, in step S502, similarly to the above-described movement history generation process, the object tracking unit 113 divides an image area where tracking is to be performed into a grid.

In step S503, the object tracking unit 113 determines whether the tracking process is executed on all the objects of tracking targets. If the object tracking unit 113 determines that the tracking process is executed on all the objects of the tracking targets, i.e., an object that has not yet been processed is not present among the tracking target objects (YES in step S503), the processing proceeds to step S515. If, on the other hand, the object tracking unit 113 determines that the tracking process is executed not on all the tracking target objects, i.e., an object that has not yet been processed is present among the objects of the tracking targets (NO in step S503), the processing proceeds to step S504.

In step S504, the object tracking unit 113 selects a single object of interest $h'_j$ from among the (plurality of) tracking target objects. The tracking target objects include an object continually tracked from a past frame and an object newly detected by object detection from a newly read frame. In the present exemplary embodiment, the object tracking unit 113 obtains object information regarding the tracking target objects using the trajectory information managed by the trajectory management unit 206 of the trajectory information collection unit 120.

In step S505, the object tracking unit 113 identifies a grid cell $g'_i$ corresponding to the current position of the object of interest $h'_j$ selected in step S504. At this time, the frame number of a frame in which the grid cell $g'_i$ is identified is set to a frame $t_0$. In step S506, the object tracking unit 113 obtains the movement history of the grid cell $g'_i$ from the movement history recorded in the storage device 112.

In step S507, the object tracking unit 113 determines whether all the clusters registered in the movement history of the grid cell $g'_i$ are searched for an object. If the object tracking unit 113 determines that all the clusters registered in the movement history of the grid cell $g'_i$ are searched for an object (YES in step S507), the processing proceeds to step S514. If, on the other hand, the object tracking unit 113 determines that not all the clusters registered in the movement history of the grid cell $g'_i$ are searched for an object, i.e., a cluster that is not searched for an object is present (NO in step S507), the processing proceeds to step S508.

In step S508, the object tracking unit 113 selects a single cluster that has not yet been searched for an object from among the clusters registered in the movement history of the grid cell $g'_i$. As the selection order, for example, clusters are selected in descending order of the search priorities set for the clusters. In the present exemplary embodiment, as described above, the unit of clustering is a grid cell in each frame corresponding to $\Delta t_k$.

In step S509, based on the selected cluster, the object tracking unit 113 determines the search range of the object of interest $h'_j$ for tracking. In the present exemplary embodiment, information regarding the cluster is a grid cell g at the movement destination and the number of difference frames $\Delta t$ from the frame $t_0$. In the present exemplary embodiment, a 3×3 grid cell area with the grid cell g as a center in a frame ($t_0+\Delta t$) is the search range.

In step S510, the object tracking unit 113 searches for an object corresponding to the object of interest $h'_j$ in the search range set in step S509. In the present exemplary embodiment, for example, using pattern matching, the object tracking unit 113 searches for the object. As the method for calculating the degree of similarity in the pattern matching, any method can be employed. For example, a method for setting the sum of the absolute values of the differences between pixel values as the degree of similarity (the sum of absolute differences (SAD)), or a method for setting the sum of the squares of the differences as the degree of similarity (the sum of squared differences (SSD)) can be used. In the present exemplary embodiment, as the method for calculating the degree of similarity, SAD is used. The method for detecting the object corresponding to the object of interest $h'_j$, however, is not limited to the pattern matching.

In step S511, the object tracking unit 113 determines whether the object corresponding to the object of interest $h'_j$ is detected by the search for the object performed in step S510. If the object tracking unit 113 determines that the object corresponding to the object of interest $h'_j$ is detected by the search for the object performed in step S510 (if the degree of similarity is greater than or equal to a threshold) (YES in step S511), the processing proceeds to step S513. If, on the other hand, the object tracking unit 113 determines that the object corresponding to the object of interest $h'_j$ is not detected by the search for the object performed in step S510 (NO in step S511), the processing proceeds to step S512.

In step S512, the object tracking unit 113 records a detection error. Information regarding a detection error in the present exemplary embodiment is the number of clusters and the number of occurred errors registered in the movement history for each grid cell ID. After the detection error is recorded, the processing returns to step S507. In step S507, the object tracking unit 113 selects a next cluster and performs the processing.

In step S513, the object tracking unit 113 creates the trajectory of the object of interest $h'_j$ from the frame $t_0$ to the frame $(t_0+\Delta t)$. In the trajectory of the object of interest $h'_j$, the position in the frame $t_0$ is known, and the position in the frame $(t_0+\Delta t)$ has been already detected in step S510. Regarding a section from a frame $(t_0+1)$ to a frame $(t_0+\Delta t-1)$, the object tracking unit 113 creates a trajectory by linear interpolation on the assumption that the object of interest $h'_j$ makes a uniform linear motion from the frame $t_0$ to the frame $(t_0+\Delta t)$. In the present exemplary embodiment, the created trajectory is recorded via the trajectory management unit 206 of the trajectory information collection unit 120. Then, the processing returns to step S503. In step S503, the object tracking unit 113 selects a next object of interest from among the plurality of tracking target objects and performs the processing.

As described above, if the object tracking unit 113 determines in step S507 that all the clusters registered in the movement history of the grid cell $g'_i$ are searched for an object (YES in step S507), the processing proceeds to step S514. This case corresponds to a case where, even if the search range set based on the movement history of the grid cell $g'_i$ is searched, the object corresponding to the object of interest $h'_j$ is not found.

In step S514, in the present exemplary embodiment, using the trajectory information collection unit 120, the object tracking unit 113 tracks the object corresponding to the object of interest $h'_k$. Specifically, the object tracking unit 113 inputs images from the frame $t_0$ to the frame $(t_0+\Delta t_k)$ to the image acquisition unit 201. Then, using the object detection unit 202, the object tracking unit 203, the human body detection unit 204, the object association unit 205, and the trajectory management unit 206, the object tracking unit 113 creates the trajectory of the object of interest $h'_j$ from the frame $t_0$ to the frame $(t_0+\Delta t_k)$. However, k is any of k=1, 2, 3, ..., 10 and is set to the smallest value k belonging to a grid cell different from the grid cell $g'_i$. If the object does not move to a grid cell different from the grid cell $g'_i$ even when k=10, the object tracking unit 113 treats the object as having disappeared and suspends the tracking. If the processing is completed, the processing proceeds to step S503.

If it is determined in step S503 that the process is executed on all the tracking target objects (YES in step S503), the processing proceeds to step S515. In step S515, based on the detection error information recorded in step S512, the object tracking unit 113 calculates the error rate for each grid cell. In the present exemplary embodiment, the error rate=(the number of errors that occur in the grid cell)/(the number of clusters registered in the movement history of the grid cell).

In step S516, the object tracking unit 113 determines whether, as a result of calculating the error rate in step S515, there is a grid cell with the error rate being greater than or equal to a predetermined threshold. If the object tracking unit 113 determines that there is a grid cell with the error rate being greater than or equal to the predetermined threshold (YES in step S516), the processing proceeds to step S517. If the object tracking unit 113 determines that there is no such a grid cell (NO in step S516), the tracking process ends.

In step S517, the history management unit 111 regenerates the movement history of the grid cell with the error rate being greater than or equal to the predetermined threshold. The method for generating the movement history is similar to that in the movement history generation process described above. Then, after the movement history is regenerated, the tracking process ends.

As described above, the image processing apparatus according to the present exemplary embodiment generates the movement history of an object and performs a tracking process using the generated movement history, and thereby can reduce the frequency of occurrence of detection errors in which the object is not detected in the search range while limiting a search range for tracking. Consequently, it is possible to reduce the calculation cost of processing without reducing tracking accuracy.

Next, a second exemplary embodiment of the present disclosure is described.

In the first exemplary embodiment described above, a case has been described where existing trajectory information regarding an object is used. In the second exemplary embodiment, a description is given of a method for sequentially generating movement history and performing tracking without using existing trajectory information to generate movement history.

Figure 6:
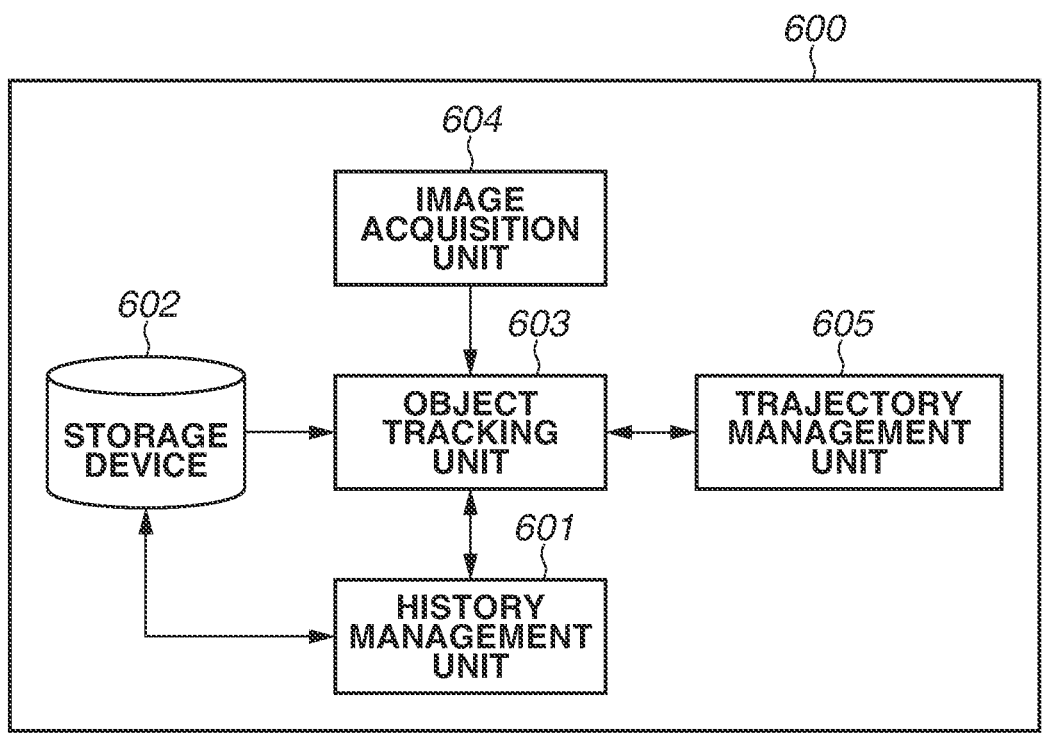
FIG. 6 is a block diagram illustrating an example of a configuration of an image processing apparatus according to one or more aspects of the present disclosure.

FIG. 6 is a block diagram illustrating an example of a configuration of an image processing apparatus 600 according to the second exemplary embodiment. The image processing apparatus 600 includes a history management unit 601, a storage device 602, an object tracking unit 603, an image acquisition unit 604, and a trajectory management unit 605. The history management unit 601 generates the movement history of each object. The movement history of the object generated by the history management unit 601 is stored in the storage device 602.

The object tracking unit 603 detects a tracking target object from an image acquired by the image acquisition unit 604, thereby tracking the tracking target object. The image acquisition unit 604 acquires an image as a processing target in chronological order from an external apparatus such as a camera or a server. The image acquisition unit 604 may acquire an image saved in an external memory. The trajectory management unit 605 manages trajectory information regarding the object tracked by the object tracking unit 603.

<Generation of Movement History>

Figure 7:
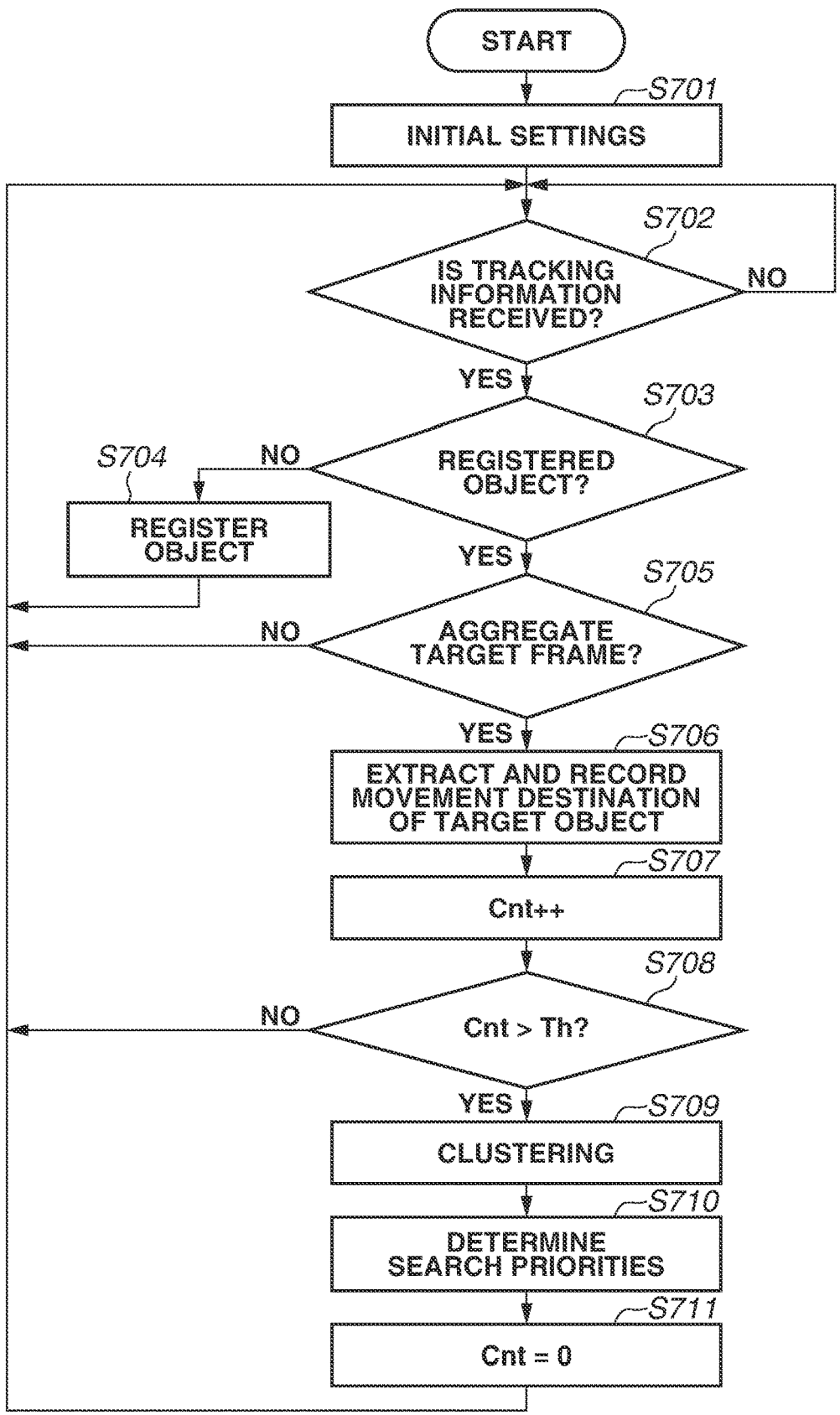
FIG. 7 is a flowchart illustrating an example of a movement history generation process according to one or more aspects of the present disclosure.

A description is given below of the generation of the movement history of an object according to the second exemplary embodiment. FIG. 7 is a flowchart illustrating an example of a movement history generation process according to the second exemplary embodiment.

In step S701, the history management unit 601 makes initial settings. In the present exemplary embodiment, similar to the first exemplary embodiment, the history management unit 601 divides an image area into a grid. The value of $\Delta t_k$ used to aggregate the movement destinations of an object is set. At this time, $\Delta t_k$ is set to be $\Delta t_k=10\times k$ (k=1, 2, 3, . . . , 10). The history management unit 601 initializes the value of a variable Cnt to 0. The variable Cnt is used as a counter for counting the number of aggregation times of tracking information sent from the object tracking unit 603.

If the initial settings are completed, in step S702, the history management unit 601 receives tracking information from the object tracking unit 603. In the present exemplary embodiment, the received tracking information includes an object ID, a frame number, and an object position (coordinates). The object ID is a common ID assigned to each tracking target object and is used for tracking by the object tracking unit 603 and used for trajectory management by the trajectory management unit 605. If the tracking information from the object tracking unit 603 is not present (NO in step S702), the history management unit 601 waits until the tracking information is received.

If the tracking information is received (YES in step S702), the processing proceeds to step S703. In step S703, the history management unit 601 determines whether an object h included in the tracking information is an object registered as a movement history management object. The determination of whether the object h is a registered object is made by detecting an object ID in registration information held in the storage device 602.

As a result of the determination in step S703, if the history management unit 601 determines that the object h included in the tracking information is an unregistered object (NO in step S703), the processing proceeds to step S704. In step S704, the history management unit 601 registers, as a movement history management object, the object h included in the tracking information. The information registered at this time includes information such as the object ID, a frame number ($=t_0$) as first appearance information regarding the object, and a grid cell ($=g$) identified from the object position (the coordinates). The registration information is held using the storage device 602. After the registration, the registration information can be referenced by specifying the object ID.

As a result of the determination in step S703, if the history management unit 601 determines that the object h included in the tracking information is registered as a movement history management object (YES in step S703), the processing proceeds to step S705.

In step S705, the history management unit 601 extracts a frame number t from the tracking information. Next, the history management unit 601 determines whether $\Delta t=t-t_0 \in \Delta t_k$, i.e., the frame is a frame as an aggregate target. If it is determined that the frame is a frame of an aggregate target (YES in step S705), the processing proceeds to step S706. If not (NO in step S705), the processing proceeds to step S702.

In step S706, the history management unit 601 records the object position (coordinates) of the object h as the movement destination of the object h in a frame ($t_0+\Delta t_k$). Then, in step S707, the history management unit 601 increments the value of the variable Cnt by 1. In step S708, the history management unit 601 determines whether the value of the variable Cnt is greater than a threshold Th determined in advance. In other words, in step S708, the history management unit 601 determines whether data sufficient to generate the movement history is collected.

If the history management unit 601 determines that the value of the variable Cnt is less than or equal to the threshold Th determined in advance (NO in step S708), the processing proceeds to step S702. If the history management unit 601 determines that the value of the variable Cnt is greater than the threshold Th (YES in step S708), the processing proceeds to step S709.

In step S709, the history management unit 601 clusters the movement destinations of objects for each grid cell. In this case, a description is given focusing on a grid cell $g_i$. As the registration information, the history management unit 601 extracts objects $h_j$ having passed through the grid cell $g_i$ and clusters the movement destinations of the objects $h_j$. In the present exemplary embodiment, the unit of clustering is each grid cell in each frame corresponding to $\Delta t_k$. Thus, a counter is provided for each grid cell in each frame corresponding to $\Delta t_k$, and the number of times the grid cell is specified as the movement destination (the coordinates of the movement destination belong to the grid cell) is counted. If the counting is completed, the history management unit 601 extracts a grid cell ($\Delta t_k$, $g_i$) having a count value greater than or equal to a predetermined number of times. If grid cells having count values greater than or equal to the predetermined number of times are adjacent to each other, the grid cells may be joined together as a single cluster. In the present exemplary embodiment, for ease of description, the grid cells are not joined together, and are treated as individual clusters.

In step S710, the history management unit 601 sets search priorities for the grid cells extracted in step S709. In the present exemplary embodiment, the history management unit 601 calculates a priority score Sc by using $Sc=n \times k$ and sets the priority score Sc in such a manner that the higher the priority score Sc of the grid cell is, the higher the search priority is. n is a count number indicating the number of times the grid cell is specified as the movement destination. k is k in $\Delta t_k=10\times k$ (k=1, 2, 3, . . . , 10). In other words, the greater the count number n is, the more likely the grid cell is to be the movement destination. The greater the value k is, the more reduced the calculation amount can be. If the setting of the search priorities is completed, the history management unit 601 adds the search priorities set in step S710 to the movement history regarding the grid cell $g_i$ and then records the movement history in the storage device 602. If the recording is completed, then in step S711, the history management unit 601 sets the value of the variable Cnt to 0, and the processing proceeds to step S702.

<Tracking Process>

Next, a description is given of a tracking process performed by the image processing apparatus 600 according to the second exemplary embodiment. In the present exemplary embodiment, using the movement history generated as described above, the object tracking unit 603 of the image processing apparatus 600 performs an object tracking process. The tracking process according to the second exemplary embodiment is basically similar to the tracking process according to the first exemplary embodiment illustrated in FIG. 5.

In the second exemplary embodiment, however, in step S504, when selecting the single object of interest $h'_j$, the object tracking unit 603 obtains object information regarding the tracking target objects at the current time using the tracking information managed by the trajectory management unit 605. In step S513, when the trajectory of the object of interest $h'_j$ from the frame $t_0$ to the frame ($t_0+\Delta t$) is created, the object tracking unit 603 records the created trajectory in the trajectory management unit 605.

As described above, the image processing apparatus according to the present exemplary embodiment generates the movement history of an object and performs a tracking process using the generated movement history, and thereby can reduce the frequency of occurrence of detection errors in which the object is not detected in the search range while limiting a search range for tracking. Consequently, it is possible to reduce the calculation cost of processing without reducing tracking accuracy.

In the first and second exemplary embodiments, an image area where tracking is to be performed is divided into a grid, and the movement history is generated for each grid cell. A method other than the grid division can also be used. For example, a plurality of partial areas of free shapes is set, and each partial area is treated similarly to a grid cell in the present exemplary embodiment, whereby it is possible to realize the present disclosure. As a matter of course, if the processing time is not an issue, partial areas are set to pixels, whereby it is possible to realize the present disclosure in pixel units.

In the first and second exemplary embodiments, $\Delta t_k = 10 \times k$ ($k = 1, 2, 3, \ldots, 10$), and a frame in which clustering is performed is $t_0 + t_k$. The present disclosure, however, is not limited to this method. Alternatively, the frame in which clustering is performed can be freely set. In the first and second exemplary embodiments, a method for calculating a priority score is defined, and search priorities are set using the priority score. The present disclosure, however, is not limited to this. Alternatively, the search priorities can be set by any other method. For example, a configuration may be employed in which the priorities are randomly set.

In the first and second exemplary embodiments, the movement destinations of objects are clustered, but do not necessarily need to be clustered. For example, a representative movement destination and a peripheral area of the representative movement destination may be selected from among the movement destinations of the objects. In the first and second exemplary embodiments, a search range is determined based on a cluster registered in the movement history. Alternatively, the search range may be determined taking another factor into account. For example, based on the time when the search range is set, the size of the search range may be increased or reduced. For example, the search range is set to be small during the morning commute time zone, and the search range is set to be wide during the late-afternoon shopping time zone, whereby it is possible to reduce the frequency of occurrence of detection errors.

In the first and second exemplary embodiments, the attributes of a tracking target object, such as a gender and an age of a person, are not used for tracking. Alternatively, these attributes may be detected and used. With this configuration, for example, it is possible to create movement history for each attribute and also perform tracking for each attribute. This achieves the effect of improving tracking accuracy. In the first and second exemplary embodiments, the observation position, the movement destination, and the number of movement destination difference frames of an object are not output, such as being displayed. Alternatively, a configuration may be employed in which these pieces of information are output. In this way, it is possible to find out the cause of the failure of tracking. A configuration may be employed in which an interface for correcting an internal parameter such as the value of $\Delta t_k$ is included. In this way, according to the cause of the failure of tracking, it is possible to manually correct the parameter. Thus, the user can control an operation in the present exemplary embodiment.

The above-described exemplary embodiments can also be achieved by the process of supplying a program for achieving one or more functions of the exemplary embodiments to a system or an apparatus via a network or a storage medium, and of causing one or more processors of a computer of the system or the apparatus to read and execute the program. The above exemplary embodiments can also be achieved by a circuit (e.g., application-specific integrated circuit (ASIC)) for achieving the one or more functions.

Figure 8:
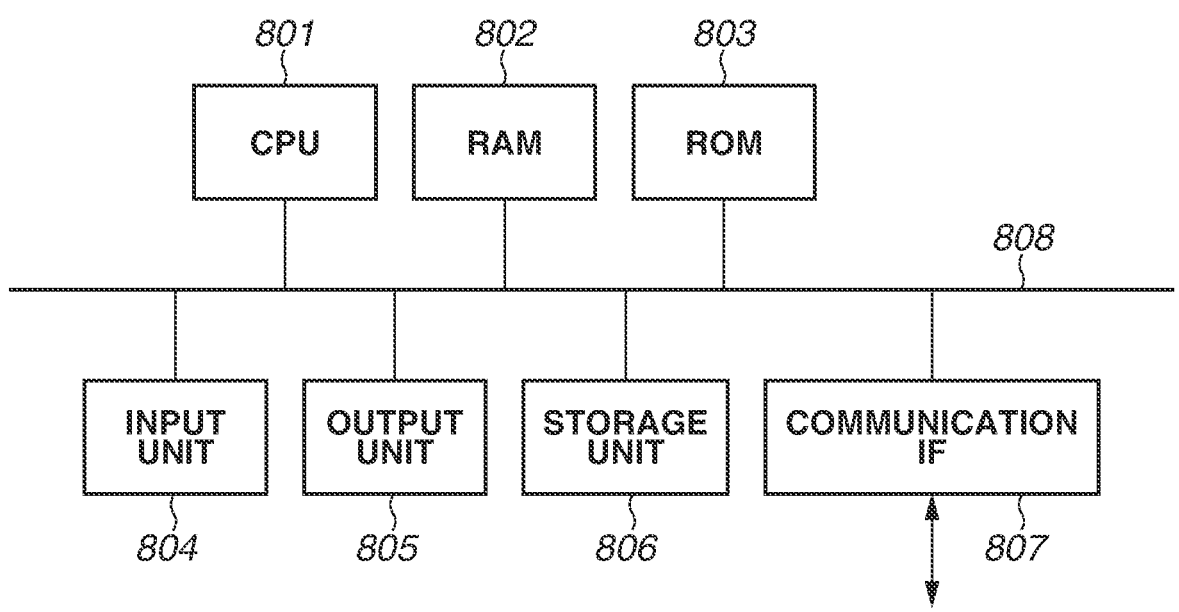
FIG. 8 is a block diagram illustrating an example of a hardware configuration of the image processing apparatus according to one or more aspects of the present disclosure.

FIG. 8 is a block diagram illustrating an example of a hardware configuration of the image processing apparatus according to the present exemplary embodiment. As illustrated in FIG. 8, the image processing apparatus includes a central processing unit (CPU) 801, a random-access memory (RAM) 802, a read-only memory (ROM) 803, an input unit 804, an output unit 805, a storage unit 806, and a communication interface (IF) 807. The CPU 801, the RAM 802, the ROM 803, the input unit 804, the output unit 805, the storage unit 806, and the communication IF 807 are connected to each other via a system bus 808 so that the components can communicate with each other.

The CPU 801 controls the components connected to the system bus 808. The RAM 802 is used as a main storage device for the CPU 801. The ROM 803 stores a startup program for the apparatus. The CPU 801 reads a program from the storage unit 806 and executes the program, thereby achieving, for example, the functions of the history management unit and the object tracking unit included in the image processing apparatus.

The input unit 804 receives an input from the user and inputs image data. The output unit 805 outputs image data and the processing result of the CPU 801. The storage unit 806 is a non-volatile storage device that stores a control program regarding the operation and the processing of the apparatus. The communication IF 807 controls information communication between the apparatus and another apparatus (e.g., relay station).

If the apparatus configured as described above is powered on, then according to the startup program stored in the ROM 803, the CPU 801 loads the control program from the storage unit 806 into the RAM 802. The CPU 801 executes processing according to the control program loaded into the RAM 802, thereby achieving the functions of the image processing apparatus. In this way, the CPU 801 of the image processing apparatus executes processing based on the control program, thereby achieving the functional configuration and the operation of the image processing apparatus.

The above exemplary embodiments described above merely illustrate specific examples for realizing the present disclosure, and the technical scope of the present disclosure should not be interpreted in a limited manner based on these exemplary embodiments. Thus, the present disclosure can be realized in various manners without departing from the technical idea or the main feature of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-012348, filed Jan. 28, 2019, which is hereby incorporated by reference herein in its entirety.

What is claimed is:

1. An image processing apparatus comprising:
a processor; and
a memory storing executable instructions which, when executed by the processor, cause the image processing apparatus to perform operations including:
generating a movement history for each area among a plurality of areas into which an image is divided;
setting a search range in the image based on the movement history;
detecting a target object in the search range; and
associating a currently detected target object with a previously detected target object, to perform tracking on the target object,
wherein an error rate for an area of the plurality of areas is calculated based on a number of times when the target object is not detected in the area, and the movement history of an area where an error rate is greater than or equal to a predetermined threshold is re-generated.

2. The image processing apparatus according to claim 1, wherein the plurality of areas are units of grid cells generated by dividing the image into a grid.

3. The image processing apparatus according to claim 1, wherein the movement history is generated based on a result of a tracking of the target object.

4. The image processing apparatus according to claim 1, wherein executing the executable instructions causes the image processing apparatus to perform further operations including: collecting trajectory information identifying a position of an object in a past image,
wherein the movement history is generated based on the collected trajectory information.

5. The image processing apparatus according to claim 1, wherein the movement history is generated based on information indicating a movement destination of the target object.

6. The image processing apparatus according to claim 5, wherein the target object is searched in the search range in order based on a search priority set for the search range.

7. The image processing apparatus according to claim 1, wherein the movement history of the object includes an observation position of the target object and a position of a movement destination of the target object.

8. The image processing apparatus according to claim 7, wherein the movement history of the object includes a number of difference frames or a difference in time between an image at the observation position and an image at the position of the movement destination.

9. The image processing apparatus according to claim 7, wherein the search range is set based on the position of the movement destination.

10. The image processing apparatus according to claim 9, wherein the search range is set as a square of a predetermined size with the position of the movement destination as a center.

11. The image processing apparatus according to claim 1, wherein the movement history is generated based on information aggregated regarding movement destinations of a plurality of objects.

12. The image processing apparatus according to claim 11, wherein the movement history is generated by clustering on positions of the movement destinations of the plurality of objects.

13. The image processing apparatus according to claim 12, wherein a search priority is set for each of clusters generated by the clustering.

14. The image processing apparatus according to claim 1, wherein a plurality of search ranges is set based on the movement history.

15. The image processing apparatus according to claim 1, wherein an object continually tracked from a past image and an object newly detected from a current image are set as tracking targets.

16. An image processing method comprising:
generating a movement history for each area among a plurality of areas into which an image is divided;
setting a search range in the image based on the movement history; and
detecting a target object in the search range; and
associating a currently detected target object with a previously detected target object, to perform tracking on the target object,
wherein an error rate for an area of the plurality of areas is calculated based on a number of times when the target object is not detected in the area, and the movement history of an area where an error rate is greater than or equal to a predetermined threshold is re-generated.

17. A non-transitory computer-readable storage medium that stores a program for causing an image processing apparatus to execute a image processing method, the method comprising:
generating a movement history for each area among a plurality of areas into which an image is divided;
setting a search range in the image based on the movement history; and
detecting a target object in the search range; and
associating a currently detected target object with a previously detected target object, to perform tracking on the target object,
wherein an error rate for an area of the plurality of areas is calculated based on a number of times when the target object is not detected in the area, and the movement history of an area where an error rate is greater than or equal to a predetermined threshold is re-generated.

* * * * *